United States Patent [19]

Mochimaru

[11] 4,105,007

[45] Aug. 8, 1978

[54] DEVICE FOR SUPPRESSING IGNITION NOISE

[76] Inventor: Masayoshi Mochimaru, 25-20, Akabanedai 3 chome, Kita-ku, Tokyo, Japan

[21] Appl. No.: 720,381

[22] Filed: Sep. 3, 1976

[30] Foreign Application Priority Data

Apr. 2, 1976 [JP] Japan .................................. 51-36132

[51] Int. Cl.² .............................................. H04B 3/28
[52] U.S. Cl. ............................ 123/148 P; 123/148 D; 333/12; 333/70 S
[58] Field of Search ........... 123/148 A, 148 P, 148 D; 336/90, 198, 208; 307/105; 333/70 S, 70 CR, 12

[56] References Cited

U.S. PATENT DOCUMENTS

| 1,230,615 | 6/1917 | Steinmetz | 123/148 P |
|---|---|---|---|
| 1,971,497 | 8/1934 | Miller | 123/148 P |
| 2,367,396 | 1/1945 | Hallett | 123/148 P |
| 2,482,902 | 9/1949 | Clark | 336/90 |
| 3,361,886 | 1/1968 | Prickett | 123/148 P X |
| 3,808,562 | 4/1974 | Weigel et al. | 333/70 S X |

*Primary Examiner*—Charles J. Myhre
*Assistant Examiner*—Tony M. Argenbright
*Attorney, Agent, or Firm*—Armstrong, Nikaido, Marmelstein & Kubovcik

[57] ABSTRACT

A device for preventing or suppressing ignition noise comprises an assembly of a resistor and a choke coil connected parallel to the resistor. The assembly is inserted in series in a high voltage circuit of a gasoline engine. The assembly can be mounted in an ignition coil.

2 Claims, 3 Drawing Figures

DEVICE FOR SUPPRESSING IGNITION NOISE

BACKGROUND OF THE INVENTION

The present invention relates to a device for suppressing the noise emission by a car engine.

An gasoline engine provided in a current car utilizes a discharge in a gap of a plug by high voltage induced on an ignition coil, for providing a spark in a plug of an engine. However, said discharge accompanies an undesired high frequency radio wave noise by the resonant circuit composed of a negative resistance induced by the discharge and the inductance of an ignition coil. Said radio wave disturbs the operation of a broadcast radio receiver by providing an undesired noise.

A prior art for preventing said noise is to insert a resistor in a secondary circuit of an ignition coil circuit. Said reistor operates to neutralize said negative resistance.

However, said prior art has the disadvantages that the spark energy applied to the gap for discharge is reduced since the power consumption in the resistance is large, and that the miss-firing of an engine occurs when the ratio of the gasoline to the air is reduced at the start-up time of an engine and/or the acceleration period of a car. If the value of the resistance is designed small for overcoming said disadvantages, the effect of the resistance for suppressing the ignition noise is also reduced.

SUMMARY OF THE INVENTION

It is an object, therefore, of the present invention to overcome the disadvantages and limitations of a prior art by providing a new and improved device for suppressing the ignition noise.

The above and other objects are attained by the device for suppressing the ignition noise comprising a resistor and a choke coil connected parallel to the resistor.

BRIEF DESCRIPTION OF THE DRAWINGS

The foregoing and other objects, features, and attendant advantages of the present invention will be appareciated as the same become better understand by means of the following description and accompanying drawings wherein.

DESCRIPTION OF THE PREFERRED EMBODIMENTS

Figure 1:
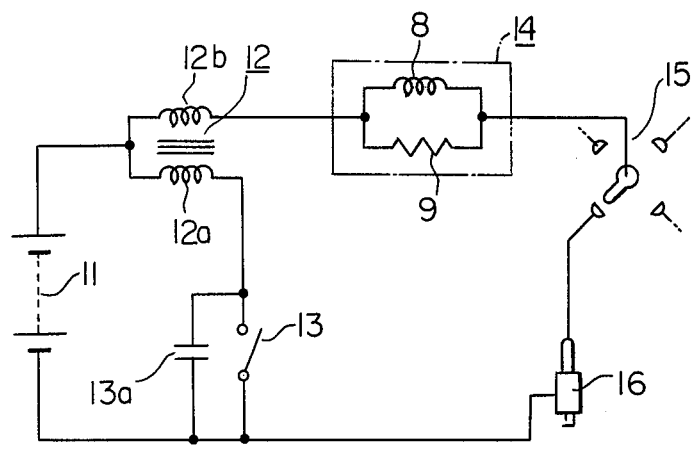
FIG. 1 shows a circuit-diagram of an ignition device having the present device for suppressing the ignition noise.

In FIG. 1, the reference numeral 11 is a battery of 12 volts, 12 is an ignition coil having a primary winding 12a and a secondary winding 12b for generating high voltage, 13 is an electric contact for connecting/disconnecting a primary current of the ignition coil, and 13a is a capacitor. The high voltage generated at the secondary winding 12b of the ignition coil 12 is applied to the selected spark plug 16 through the noise suppressor 14 and the distributor 15, and discharges in the gap of the plug 16 to fire the gasoline-air mixture. The noise suppressor 14 is a parallel circuit of the choke coil 8 and the resistor 9. In the noise suppressor 14, the high frequency current which causes the noise wave can not flow in the choke coil 8 due to the high impedance of the coil, therefore, said high frequency current flows through the resistance 9, thus the energy of the high frequency current is attenuated in the resistor 9. On the other hand, the discharge current which has a strong firing effect and is low frequency, flows through the choke coil 8 whose impedance is relatively small for low frequency current. Accordingly, the discharge energy according to the present invention is considerably larger than that of the prior art in which the noise suppressing circuit has only a resistor but does not have a choke coil. The present invention has the effect that the firing operation is considerably improved even on the bad condition like the unproper gasoline-air mixture ratio, and/or the dirty ignition plug.

The value of the inductance of the choke coil 8 must be larger than 1 mH (milli-Henry), and the best value of the inductance is about 10 mH. And the resistance of the resistor 9 is about 15 KΩ which is almost the same as the negative resistance of the discharge air-space, and the resistor 9 can be a solid type carbon resistor. The choke coil 8 can be not only an air-core choke coil, but also a ferrite-core choke coil. The coke coil 8 has been shown just as the one embodiment of the present invention, but many modifications are, of course, possible. For instance, the high-order reactance circuit network which is equivalent to the choke coil can be used instead of the mere choke coil so long as said network has a small impedance for the low frequency discharge current. Further, a series circuit of the resistor and the device which has low impedance for the high frequency current is possible.

Figure 2:
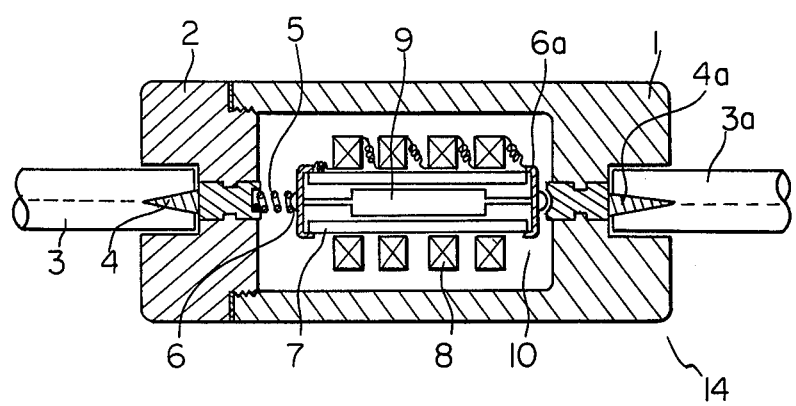
FIG. 2 is the cross-sectional view of the embodiment of the device for suppressing the ignition noise according to the present invention.

FIG. 2 is the embodiment of the structure of the noise suppressor 14. In FIG. 2, the reference numeral 1 is a cylindrical holder made of dielectric material like bakelite or vinyl resin. At the end of the cylindrical holder 1 a screw cap 2 is secured. A pair of conductive members 4 and 4a are buried in the holder 1 and are connected to a pair of electrodes 6 and 6a through a spring 5. A pair of high voltage electric wires 3 and 3a touch to the members 4 and 4a, respectively. The numeral 7 is a cylindrical bobbin made of earthenware or porcelain. On the bobbin 7, a choke coil 8 which has four honeycomb coils is wound. A pair of ends of the coil are electrically connected to the pair of electrodes 6 and 6a, respectively. The numeral 9 is a fixed resistor inserted in the bobbin 7 and is connected electrically parallel to the coil 8. The numeral 10 shows the insulating oil for improving the withstand voltage of the coil 8. The insulating oil 10 can also be silicone resin.

Figure 3:
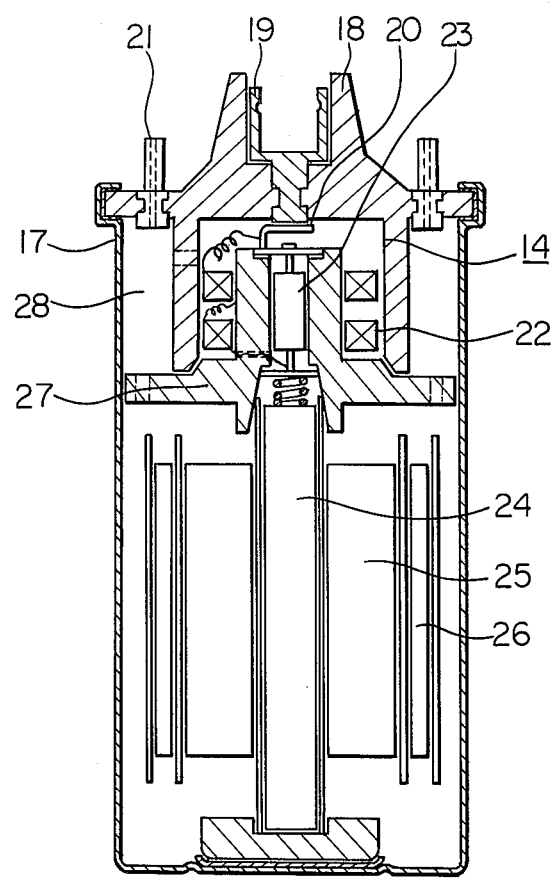
FIG. 3 is the cross-sectional view of the ohther embodiment of the device for suppressing the ignition noise according to the present invention.

FIG. 3 shows the other embodiment of the structure of the noise suppressor according to the present invention. In FIG. 3, the noise suppressor is inserted in the ignition coil. In FIG. 3, the reference numeral 17 is an ignition coil holder or housing, 18 is a top insulator, 19 is a terminal for a high voltage wire. The terminal 19 is connected to one (20) of the terminals of the noise suppressor 14. 21 is a terminal of a primary winding of an ignition coil. 22 is a choke coil of the noise suppressor, and corresponds to the coil 8 in FIG. 2, and 23 is a resistor of the noise suppressor and corresponds to the resistor 9 in FIG. 2. The other electrode of the noise suppressor is connected to the secondary high voltage winding of the ignition coil. 24 is a core of an ignition coil, and doubles as a secondary high voltage terminal.

The structure of an ignition coil in FIG. 3 is similar to that of a prior art, and 25 is a secondary high voltage coil and 26 is a primary coil. 27 is a support means made of resin for supporting a core and the noise suppressor. 28 is insulation oil. It should be noted of course that the noise suppressor in FIG. 3 has the effect mentioned in accordance with FIG. 1 and FIG. 2.

As apparent from the above explanation, the important feature of the present invention is a by-pass circuit of low frequency current connected parallel to a noise suppressing resistor, and said by-pass circuit reduces the loss of the firing energy in the resistor. Accordingly, almost all energy generated in an ignition coil is applied to an ignition plug, thus the strong discharge is obtained.

A gasoline engine provided in a car, having the present noise suppressor, provides the stable firing characteristics in various load conditions, and improves the acceleration characteristics and fuel consumption.

From the foregoing, it will now be apparent that a new and improved noise suppressor has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A device for suppressing ignition noise, inserted in series with the secondary high voltage circuit of an ignition coil, said device comprising:
   (a) a cylindrical housing;
   (b) a support means positioned in said housing for dividing said housing into axially aligned first and second compartments;
   (c) noise suppression means mounted in said first compartment, said noise suppression means including a choke coil having an air core bobbin at the center of said support means, an inductive coil having a plurality of honey-comb sections wound on said bobbin and a resistor mounted inside of said bobbin wherein said inductive coil and said resistor are connected electrically in parallel;
   (d) a high voltage terminal positioned in said first compartment, said noise suppression means having one terminal connected to said high voltage terminal;
   (e) an ignition coil means mounted in said second compartment, said ignition coil means including a core, and a primary and secondary winding wound on said core, said secondary winding being electrically connected to said core; and
   (f) spring means positioned between said noise suppression means and said core for electrically connecting said secondary winding through said core to said noise suppression means.

2. The invention as defined in claim 1, wherein the value of inductance of the choke coil is at least 1 mH.

* * * * *